United States Patent

Vago et al.

[15] 3,683,118

[45] Aug. 8, 1972

[54] INTERRUPTOR FOR RINGING SIGNALS FROM AUTOMATIC TELEPHONE EXCHANGES

[72] Inventors: Frans Vago, Stockholm; Tadeusz Wolpert, Bandhagen, both of Sweden

[73] Assignee: Telefonaktiebolaget L. M. Ericsson, Stockholm, Sweden

[22] Filed: Aug. 26, 1970

[21] Appl. No.: 67,156

[30] Foreign Application Priority Data

Sept. 23, 1969 Sweden ..................13,062/69

[52] U.S. Cl...............................179/18 HB, 179/84 R

[51] Int. Cl...............................................H04m 3/02

[58] Field of Search.........................179/18 HB, 84 R

[56] References Cited

UNITED STATES PATENTS 3,536,852 10/1970 Dolarmore...............179/84 R

*Primary Examiner*—Kathleen H. Claffy
*Assistant Examiner*—Thomas W. Brown
*Attorney*—Hane, Baxley & Spiecens

[57] ABSTRACT

The invention refers to telephone exchanges and concerns an interruptor for intermittent ringing signals to subscribers' lines. Since it must be possible to disconnect a called subscriber's line from the common interruptor, the ringing signals consist of an alternating voltage superimposed on the voltage of a direct current source. The interrupting is carried out by means of thyristors with electronic means used to generate ignition voltages for the thyristors.

1 Claim, 2 Drawing Figures

INVENTORS

Figures 1, 2:
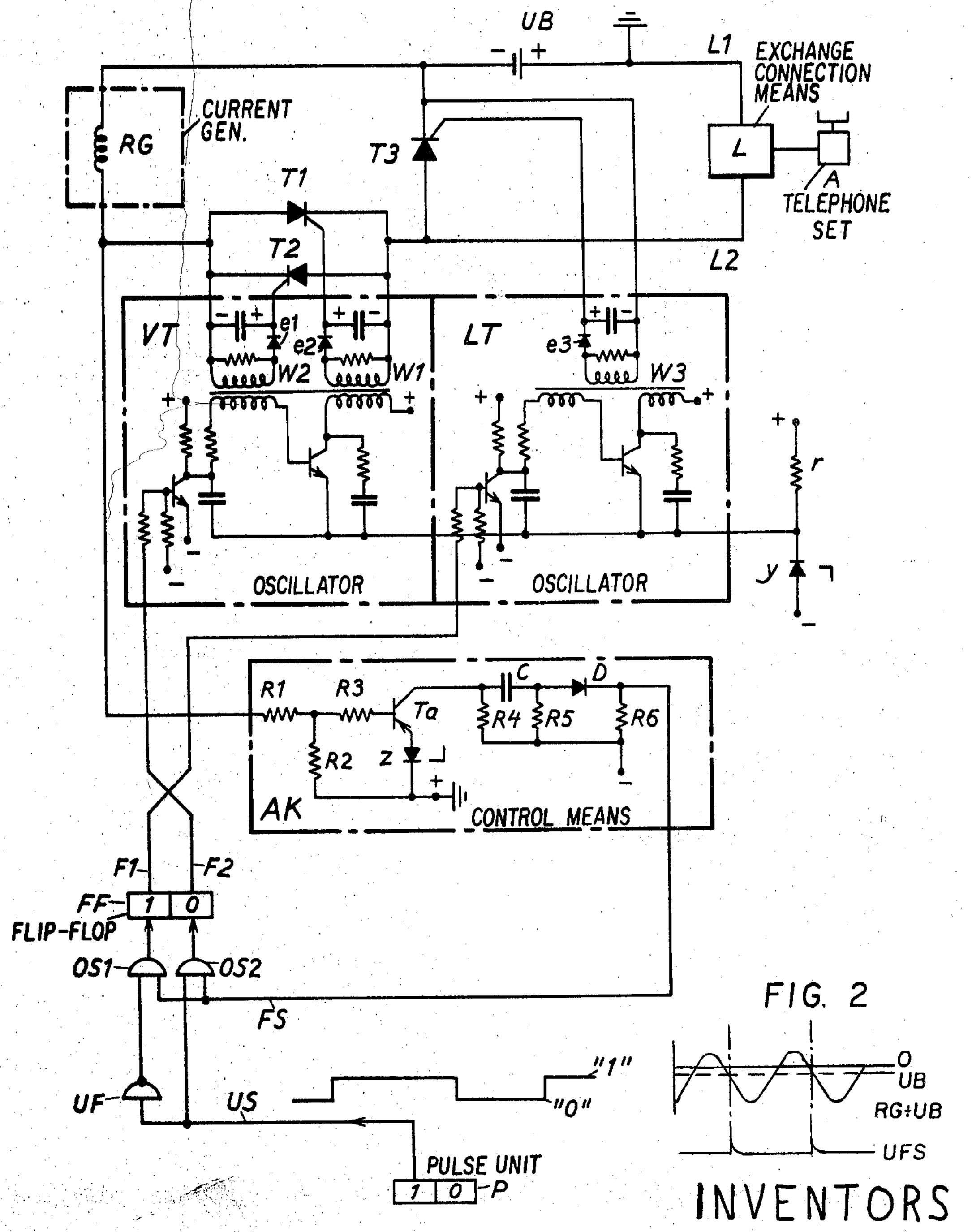

FRANS VAGO
TADEUSZ WOLPERT

BY Hane, Baxley & Spiecens
ATTORNEYS

INTERRUPTOR FOR RINGING SIGNALS FROM AUTOMATIC TELEPHONE EXCHANGES

The present invention refers to automatic telephone exchanges and concerns an interruptor for connecting intermittent ringing signals to subscribers' lines. In telephone exchanges a ringing current generator and an interruptor are required which serve the whole exchange. The ringing current generator usually is a rotary, power alternating current generator but is now increasingly often replaced by a static inverter. The interruptor is a mechanical contact device consisting of rotary cam discs which operate make contacts or make-and break contacts. Such an interruptor takes up a great deal of room and does not come up to modern demands on reliability of service. An object of the invention is to carry out the interrupting by means of static elements. The problem is complicated by the fact that it must be possible to interrupt each ringing signal at any time, namely when the subscriber answers. For this reason the ringing circuits are always connected to a direct current source and the ringing signals consist of an alternating voltage superimposed on the voltage of the direct current source. This can be carried out by means of a transformer or a choke coil of considerable dimensions since it must have a low direct current resistance and an alternating voltage. In the ringing intervals the lines must therefore be supplied with direct current and the ringing has to be carried out with alternating current superimposed on a direct current voltage. The amplitude of the alternating current is always greater than the direct voltage. Shifting between these feeding voltages is required.

The invention solves this problem in accordance with the enclosed claims.

The invention will be described more fully with reference to the accompanying drawing wherein FIG. 1 is a schematic diagram of a preferred embodiment of the invention; and FIG. 2 is a waveform diagram of signals generated by the embodiment of FIG. 1.

In FIG. 1 of the drawing, L indicates the connecting means of a telephone exchange. A indicates a subscriber's telephone set, the line of which is connected to the lines L1 and L2 by means of the connecting means L when ringing signals are to be sent to the subscriber's telephone set. The lines L1, L2 connect the connecting means L to a ringing arrangement consisting of a ringing current generator RG, thyristors T1–T3 and a direct current source UB which usually is the exchange battery of the telephone exchange. The oscillators VT and LT and a control means AK are associated with the thyristors. Furthermore there are an electronic flip-flop FF, two AND-circuits OS1, OS2, an inverting circuit UF and an electronic pulse unit P (with an output voltage US) which determines the times of signal and of interval. The oscillators VT and LT are electronic oscillators having transistors, and a transformer and have associated therewith rectifier means *e*1,*e*2,*e*3. How the oscillators function is not essential for the invention and need not be described here. The transformer of the oscillator VT has two secondary windings W1 and W2 and the transformer of the oscillator LT has one secondary winding W3. In order to increase the reliability the Zener diode *y* and the resistor *r* have been introduced.

When the pulse unit P is in its "O"-position, a ringing signal is to be transmitted and when unit P is in its "1"-position there is an interval between the ringing signals. During the intervals the AND-circuit OS2 is activated at each pulse UFS on the wire FS while circuit OS1 is blocked by the inverting circuit UF. The output F2 of flip-flop FF will be in "1"-position or high and the output F1 in the "0"-position or low and by means of a negative potential on the wire F1 the oscillator LT is in operation. The alternating voltage that is induced in the transformer winding W3 is rectified by diode e3 and is supplied to the ignition electrodes of the thyristor T3. When a circuit is closed from ground through elements L1, L, A, L2, T3 and UB, the thyristor T3 is ignited and becomes conducting.

When the pulse unit P shifts from its "1"-position to "0"-position the AND-circuit OS2 is blocked and OS1 AND-circuit is activated upon the first pulse appearing on wire FS. The state of flip-flop FF is reversed, the output f2 is changed from "1"-position to "0"-position and the output F1 from "0"-position to "1"-position. The oscillator LT stops and the oscillator VT starts by obtaining a negative voltage on the wire F2. The alternating voltages which are induced in the transformer windings W1 and W2 are rectified in diodes *e*1 and*e*2 respectively and are supplied to the ignition electrodes of the thyristors T1 and T2 respectively, so that the thyristors T1 and T2 will be ignited alternately dependent on the direction of the pulsing alternating voltage generated by units RG and UB.

Upon shifting between interval and ringing the thyristor T3 can be conducting and remains thereafter conducting even though the ignition voltage from the oscillator LT is disappearing. In order to prevent short-circuit currents passing through elements RG, T1 and T3 the switching must be carried out in such a way that thyristor T2 is ignited first and the pulsing alternating current has such a phase that thyristor T3 receives a reverse voltage and is switched out. To this end a control means AK consisting of a transistor Ta, the resistors R1–R6, a Zener diode *z*, a capacitor C and a rectifier D are provided. By means of current passing through resistors R1 and R2 the control means AK senses the instantaneous value of the pulsing alternating current RG + UB. A fraction of this voltage is supplied to the base of the transistor Ta via the resistance R3. When the voltage sensed becomes negative relative to the negative pole of the battery UB, the transistor Ta becomes conducting. A circuit is closed from ground through the Zener diode *z*, the emitter and collector of the transistor and the resistance R4. The capacitor C is charged in a circuit passing through the rectifier D, and the resistance R6. During the charging time a short voltage pulse is sent on the conductor FS. The transistor Ta is conducting until the voltage sensed by control means AK has become positive relative to the negative pole of the battery UB, and then the capacitor C is discharged. In this way the rectifier D is biased in the backward direction, and for this reason no pulse is sent out on the wire FS.

In FIG. 2 of the drawing the connection between the pulses UFS on the wire FS and the pulsing alternating voltage RG + UB is shown. Thus shifting between interval and ringing and between ringing and interval, respectively, can be carried out only when the alternating voltage from generator RG is in a definite phase position. If shifting occurs from interval to ringing, thyristor T3 is energized in the backward direction and is switched out, if conducting. If shifting takes place from ringing to interval, both thyristors T1 and T2 are switched out, since both are currentless in the shifting moment. Thyristor T3 then obtains an ignition voltage without delay and the shifting of current path takes place without interruption. This is achieved in such a way that the oscillators VT and LT are oscillating with high frequency and the connection and the disconnection of the ignition voltages take place at times which are exceedingly small compared with the time of an alternating circuit period.

What is claimed is:

1. In an automatic telephone exchange having a pair of terminals for connecting to a subscriber's line a ringing circuit alternating between a ring period and a pause period, the combination comprising: a direct voltage source, a ringing current generator, a pair of oppositely polarized thyristors connected in parallel, means for connecting said direct voltage source, said ring current generator and said pair of thyristors serially across said pair of terminals, a third thyristor connected in parallel with the series combination of said ringing current generator and said pair of thyristors, first and second controllably activatable oscillator means for generating ignition voltages for said pair of thyristors and said third thyristor, respectively, an electronic bistable device for controlling said oscillator means in such a way that only a specific one of said oscillator means is activated for each of the two different states of said bistable device, said bistable device switching states in response to a pulse signal, and a control means monitoring the instantaneous sum of the voltage of said direct voltage source and the voltage of said ringing current generator for transmitting a pulse to said bistable device only when said sum of the voltages has a given amplitude and phase.

* * * * *